United States Patent [19]
Kreft et al.

[11] Patent Number: 4,579,526
[45] Date of Patent: Apr. 1, 1986

[54] METHOD AND APPARATUS FOR THE HEAT TREATMENT OF FINE-GRAINED MATERIAL

[75] Inventors: Wilfried Kreft; Horst Kretzer, both of Ennigerloh; Heinz-Werner Thiemeyer, Beckum, all of Fed. Rep. of Germany

[73] Assignee: Krupp Polysius AG, Fed. Rep. of Germany

[21] Appl. No.: 667,978

[22] Filed: Nov. 5, 1984

[30] Foreign Application Priority Data

Nov. 25, 1983 [DE] Fed. Rep. of Germany ....... 3342687

[51] Int. Cl.⁴ .......................... F27B 15/00; F27B 7/02; C04B 7/02
[52] U.S. Cl. ...................................... 432/14; 106/100; 432/106
[58] Field of Search ................... 432/14, 106; 106/100

[56] References Cited

U.S. PATENT DOCUMENTS 3,834,860  9/1974  Fukuda et al. ............... 432/106
4,257,766  3/1981  Ritzmann et al. ............ 432/14

Primary Examiner—John J. Camby
Attorney, Agent, or Firm—Learman & McCulloch

[57] ABSTRACT

The invention relates to a method and apparatus for the heat treatment of fine-grained material wherein a pre-calcination zone formed by the kiln exhaust gas duct of a rotary kiln and into which two branch streams of cooling air which have been subjected to opposing rotational flow are introduced. In this way an equalization of the speed profile over the cross-section of the kiln exhaust gas duct and an improvement in the burning up of the fuel is achieved.

10 Claims, 4 Drawing Figures

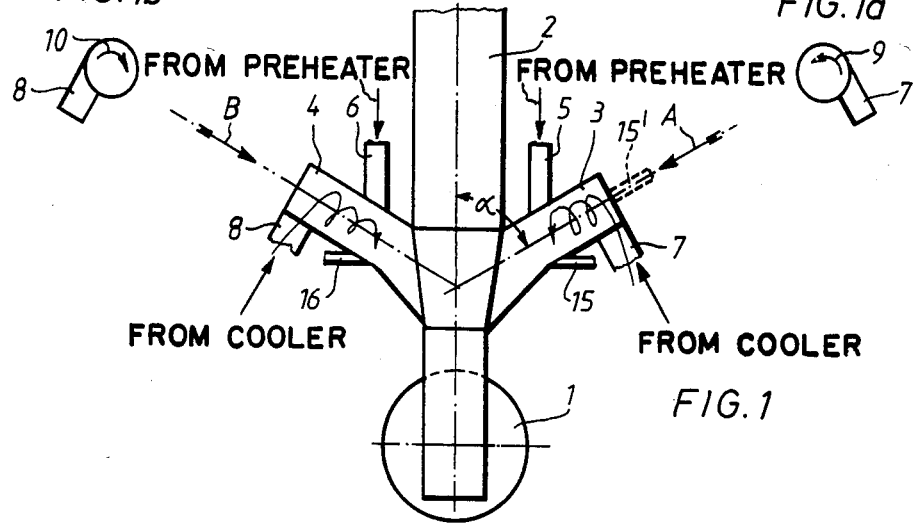

METHOD AND APPARATUS FOR THE HEAT TREATMENT OF FINE-GRAINED MATERIAL

This invention relates to a method and apparatus for the heat treatment of fine-grained material in the manufacture of cement.

BACKGROUND OF THE INVENTION

A method of the general class to which the invention relates is disclosed in German Patent Specification No. A-27 52 323. In this method a stream of cooling air is extracted from the cooler and divided into a plurality of branch streams which are introduced at different peripheral points into a kiln exhaust gas duct which forms a material precalcination zone and through which the kiln exhaust gases flow. Corresponding proportions of the material preheated in the precalcination zone are introduced into the branch streams of cooling air immediately before they enter the kiln exhaust gas duct.

The object of this invention is to improve the known method so as to achieve an improvement in the combustion of the fuel and an increase in the rate of combustion.

This object is achieved according to the invention by causing the cooling air streams to be subjected to rotation prior to their introduction to the exhaust gas duct.

The rotation to which the two branch streams of cooling air are subjected before entering the kiln exhaust gas duct results in an intensification of the intermixing of material, fuel, and cooling air in the precalcination zone and thus a marked improvement in the combustion of the fuel and an increase in the rate of combustion.

SUMMARY OF THE INVENTION

According to a preferred embodiment of the invention, before entering the kiln exhaust gas duct, the two branch streams of cooling air are subjected to an opposing rotational flow the direction of which is chosen so that, in the region of the cross-section of the kiln exhaust gas duct in which the kiln exhaust gases travel at their greatest upwardly-directed speed, the two branch streams of cooling air have a downwardly directed speed component.

In this embodiment of the invention use is made of the knowledge that in the kiln exhaust gas duct through which the kiln exhaust gases flow from the bottom upwards, and which forms the precalcination zone, there is an uneven speed profile over the cross-section of the kiln exhaust gas duct because of the deflection of the kiln exhaust gases (from their approximately horizontal flow direction as they leave the rotary kiln to an approximately vertical flow direction in the lower portion of the kiln exhaust gas duct). The highest speed is in the outer cross-sectional region of the flow and the lowest speed is in the inner cross-sectional region of the deflected flow.

If, before entering the kiln exhaust gas duct, the two branch streams of cooling air are subjected to an opposing rotational flow the direction of which is chosen so that the two branch streams of cooling air have a downwardly directed speed component in the outer region of the cross-section of the kiln exhaust gas duct in which the kiln exhaust gases travel at their highest upwardly directed speed, then in the inner region of the cross-section of the kiln exhaust gas duct in which the kiln exhaust gases travel at their lowest upwardly directed speed the two branch streams of cooling air have an upwardly directed speed component. In this way an equalisation of the speed of the resulting gas stream is achieved, which leads to a further improvement in the combustion of the fuel and a further increase in the rate of combustion.

A further improvement in the combustion of the fuel can be achieved by subjecting the two branch streams of fuel to rotational flow in the same direction as the associated branch streams of cooling air. As a result of the high turbulence and the equalisation of the speed profile over the cross-section of the kiln exhaust gas duct at the point of collision of the branch streams of cooling air, the material, fuel, and gases are rapidly and evenly intermixed with the kiln exhaust gas stream, the branch streams of fuel, and the branch streams of material which has a positive effect on the combustion of the fuel.

THE DRAWINGS

One preferred embodiment of the invention is illustrated in the drawings, in which:

FIG. 1 is a fragmentary, end view of the precalcination zone;

FIGS. 1a and 1b are elevational views of the cooling air ducts as viewed in the direction of the arrows A and B; and FIG. 2 is a side elevational view of the apparatus according to FIG. 1.

DETAILED DESCRIPTION

The apparatus for the heat treatment of fine-grained material, especially for the production of cement, which is illustrated in the drawings includes a rotary kiln 1, a preheater (preferably a multi-stage cyclone preheater) which is not shown in greater detail, a kiln exhaust duct 2 through which the exhaust gases from the rotary kiln flow, and a cooler (not shown) in communication with the outlet of the rotary kiln, as is conventional.

The kiln exhaust gas duct 2 forms a precalcination zone supplied with additional fuel for calcination of the preheated material before its entry into the rotary kiln.

From the cooler two cooling air ducts 3, 4 lead to the kiln exhaust gas duct 2 and open into the latter at an angle α with respect to the vertical of 45° to 60° at two peripherally spaced points which are approximately diametrically opposed to one another.

Material discharge ducts 5, 6 depend from the preheater and are connected to the two cooling air ducts 3, 4 before the point where they open into the kiln exhaust gas duct 2.

Upstream from the point where they open into the kiln exhaust gas duct 2 the two cooling air ducts 3, 4 are provided with inlet coupling means 7, 8 for producing rotational or spiraling flow of the gas coming from the cooler. The couplings 7, 8 are formed substantially tangential relative to the ducts 3 and 4 and therefore subject the two branch streams of cooling air in the ducts 3, 4 to opposite spiraling or rotational flow, the direction of which is illustrated by the arrows 9 and 10. Thus, viewed in the direction of the arrow A, the branch stream of cooling air passing through the cooling air duct 3 has a rotational flow to the left (arrow 9), whilst the branch stream of cooling air passing through the cooling air duct 4, viewed in the direction of the arrow B, has a rotational flow to the right (arrow 10). The effect achieved by this will be explained with the aid of FIG. 2.

The kiln exhaust gases leave the rotary kiln 1 in an approximately horizontal direction (arrow 11) and are deflected into an approximately vertical direction in the inlet housing 12 of the rotary kiln and flow through the kiln exhaust gas duct 2 to the preheater. This deflection results in the speed profile in the kiln exhaust gas duct 2 indicated by the arrow 13 of FIG. 2. That is, the speed of the deflected kiln exhaust gases is higher in the outer cross-sectional region than in the inner cross-sectional region.

The opposing rotational flow to which the two branch streams of cooling air are subjected by flowing through the couplings 7, 8 causes these two branch streams of cooling air to enter the kiln exhaust gas duct 2 with a direction of rotational flow which is characterised in FIG. 2 by the arrow 14. It will be noted that the direction of this rotational flow is chosen so that each of the two branch streams of cooling air has a downwardly directed speed component in the outer region of the cross-section of the kiln exhaust gas duct in which the kiln exhaust gases travel at their highest upwardly directed speed, whilst conversely in the inner region of the cross-section of the kiln exhaust gas duct in which the kiln exhaust gases travel at their lowest upwardly directed speed the two branch streams of cooling air have an upwardly directed speed component. This produces the desired equalisation of the resulting speed over the whole cross-section of the kiln exhaust gas duct which, together with the turbulence caused by the intermixing of the branch streams of cooling air which have been subjected to rotational flow, leads to a significant improvement in the combustion of the fuel.

In the illustrated embodiment the fuel is delivered via fuel supply lines 15, 16 to the region of the underside of the cooling air ducts 3, 4. However, it is also possible for fuel to be delivered in the region of the couplings 7, 8 for producing rotational flow, as indicated by the fuel supply line 15'. The fuel supply lines 15, 16 are advantageously provided with vanes or other conventional means for producing rotational flow in the same direction as the rotational flow of the associated branch stream of cooling air.

The force of the rotational flow of the two branch streams of cooling air increases according to an increase in the flow of air through the coupling means. The flow speed of the branch streams of cooling air in the inlet spiral, which serves to produce the rotational flow, is advantageously two to five times as high as the flow speed prevailing in the adjoining duct 3 or 4 between this inlet spiral (means 7 or 8 for producing the rotational flow) and the kiln exhaust gas duct 2.

We claim:

1. In a method for the heat treatment of fine-grained material wherein:
   (a) relatively hot exhaust gases from a calcining kiln flow upwardly through a precalciner exhaust gas duct, the rate of speed of such exhaust gases being different at different cross-sectional regions of said duct;
   (b) material to be precalcined is delivered to branch pipes communicating with said duct at peripherally spaced points; and
   (c) air relatively cool is delivered into said duct via each of said branch pipes; the improvement comprising:
      swirling said air as it traverses each of said branch pipes in a rotational direction such that the air entering said duct from each of said branch pipes has a downward component in that cross-sectional region of said duct where the upward speed of said exhaust gases is greatest.

2. The method according to claim 1 wherein said branch pipes are two in number and are diametrically opposite one another, and wherein the cool air in the respective branch pipes is swirled in opposite directions.

3. The method according to claim 1 including introducing fuel into said exhaust duct with said cool air and swirling said fuel in the same rotational direction as the cool air.

4. The method according to claim 1 including delivering said cool air downwardly into said duct at an angle of between about 45° and 60° to the vertical.

5. The method according to claim 1 including maintaining the speed of said cool air delivered into the duct at a speed 2 to 5 times that of the air in the duct.

6. In apparatus for the heat treatment of fine-grained material having:
   (a) a kiln for calcining the material;
   (b) a kiln exhaust gas pipe extending upwardly from the kiln and through which relatively hot exhaust gases flow upwardly for precalcining the material, the speed of said exhaust gases in different cross-sectional regions of said duct being different;
   (c) means for supplying fuel to said gas duct;
   (d) branch pipes joined to said duct at peripherally spaced points; and
   (e) means for introducing said material to said branch pipes upstream of their junctures with said duct; the improvement comprising:
      means for delivering relatively cool air to said branch pipes and swirling such cool air rotationally as it passes through said branch pipes to said exhaust duct, the direction of rotation of the cool air in each of said branch pipes being such that the cool air entering said duct from each branch pipes has a downward component in the cross-sectional region of said duct where the upward speed of such gases is greatest.

7. Apparatus according to claim 6 wherein the means for delivering the cool air to each of said branch pipes comprises an air inlet tangential to its associated branch pipe.

8. Apparatus according to claim 6 wherein there are two of said branch pipes diametrically opposite one another.

9. Apparatus according to claim 6 including fuel supply means for introducing fuel to the cool air discharged from each of said branch pipes.

10. Apparatus according to claim 6 wherein each of said branch pipes is joined to said duct at a downward angle of between about 45° and 60° to the vertical.

* * * * *